June 15, 1965 J. BAER 3,188,756
DIGGING TOOTH WITH RESILIENT PLUG IN REARWARDLY EXTENDING SHANK
Filed Dec. 17, 1962 2 Sheets-Sheet 1

INVENTOR:
JOSEF BAER
BY
Robert E. Howe
ATTORNEY

INVENTOR:
JOSEF BAER
BY
ATTORNEY

United States Patent Office 3,188,756
Patented June 15, 1965

3,188,756
DIGGING TOOTH WITH RESILIENT PLUG IN
REARWARDLY EXTENDING SHANK
Josef Baer, South Milwaukee, Wis., assignor to Bucyrus-Erie Company, South Milwaukee, Wis., a corporation of Delaware
Filed Dec. 17, 1962, Ser. No. 245,111
2 Claims. (Cl. 37—142)

This invention relates to an excavator tooth assembly and more particularly to resilient connection means acting between components of a tooth assembly wherein a tooth adapter or a tooth point may be secured to a tooth base to prevent rocking movement between said base and said connected tooth point or tooth adapter.

In tooth assemblies for dippers, buckets, and the like, it is well known that the tooth points must be replaced from time to time because they become worn or may break during use. To facilitate such replacement of components of a tooth assembly, releasable securing means, such as retainer pins are used. The retainer pins must suitably join the components of the tooth assembly in such manner as to withstand the rigors of excavating or drag bucket operation. Shocks of large magnitude are imparted to the tooth assemblies on an excavator dipper or bucket, and the retainer pin must withstand these shocks and still maintain the tooth assembly in a secure manner.

During digging, each tooth is subjected to intermittent forces acting at a variety of angles to the longitudinal axis of the tooth thereby causing rocking motion between the tooth point and the supporting structure. Such rocking movement usually occurs in a vertical plane passing through the tooth during the digging cycle. The rocking movement of the tooth results in accelerated wear of the separable members of the tooth assembly, a loosening of their interconnection, and ultimate failure of the tooth assembly at the connection.

Accordingly, it is an object of this invention to provide a removable resilient connection between two separable members, a resilient connection which will prevent rocking movement between two connected members of a tooth assembly as well as providing a force acting in a direction to retain one member connected to the other.

Another object of the invention is to retain an excavator tooth on a bucket by the use of a resilient means which is expansible upon insertion of a retainer pin to prevent a rocking action between connected parts of a tooth assembly.

A further object of the invention is to provide a resilient plug member in the shank of a tooth or adapter wherein the plug member expands under compression occasioned by the insertion of a retainer pin or key to prevent relative rocking movement between the shank and the tooth base.

Another object of the invention is to provide a resilient plug for absorbing shock forces acting on the shank of the tooth or adapter.

These and other objects of the invention will be apparent from the following description and drawings of which:

Figure 1:
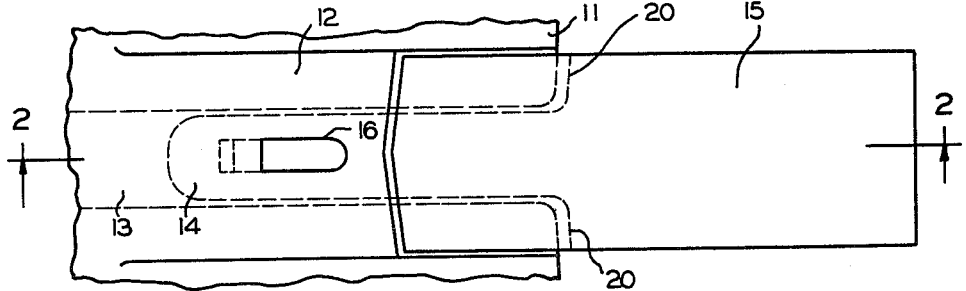
FIGURE 1 is a plan view of a fragment of the lip of an excavator bucket carrying a tooth thereon, the relative positions of the component parts being shown as prior to the insertion of a retainer key to complete such connection.

The present invention relates to a connection between separable elements such as the tooth point of an excavator tooth to a tooth base or an adapter to a tooth base. It is particularly useful where the connected elements of a tooth assembly are subjected to severe working conditions tending to shift or rock the elements relative to each other and where it is desirable that the connection be such that it can be assembled and disassembled.

In the drawings the present invention is shown as used in two typical embodiments: one retaining a tooth point on an excavator tooth base, and, the other retaining an adapter for a tooth point on an excavator tooth base. In each embodiment, a shank portion of the tooth point or the adapter is insertable in a socket provided in the tooth base and a resilient plug contained in said shank and socket is compressed by the insertion of a retaining key to fill that portion of the socket adjacent said key to prevent rocking of the shank relative to the socket in a vertical plane passing longitudinally of the tooth assembly. The compressive force of the resilient plug also aids in maintaining the key in position. Further assistance in retaining the key in position is afforded by upper and lower recessed portions on the key face opposite that key face acted upon by the resilient plug, and wherein the upper and lower recessed portions engage upper and lower portions of the base to prevent accidental loosening of the key as by rocks or the like.

Referring now to FIGURE 1, a portion of a lip 11 of an excavator dipper or bucket is shown provided with a tooth base 12 and a socket 13 adapted to receive shank 14 of an excavator tooth 15. The base 12 is provided with aligned openings 16 to receive a key 19 (FIGURE 3) therethrough. Also shank 14 is provided with an opening 17 slightly offset, preferably forwardly, from openings 16 to receive key 19 therethrough.

The base 12 provides a stable mounting for the tooth 15 in a horizontal plane passing through the tooth shank and base. To provide stability in a second plane normal to the first plane, the socket 13 is provided with tapered walls 18 which converge to the rear of the socket. The shank 14 of the tooth is tapered in a complementary manner providing, however, a nominal clearance between the shank and the socket walls to insure that the tooth shank 14 can be received fully in the bucket lip 11 and that the base 12 will be in contact with the walls of respective complementary-formed recesses 20 provided on opposite sides of the tooth.

Formerly the shank of the tooth has been retained on its base by means of a bolted connection or a tapered pin driven into the aligned opening provided in the base and the shank of the tooth. Also resilient plugs have been used to assist in maintaining a locking key in position for connecting the tooth point to a base. These retaining means provide the necessary force acting in a direction parallel to the longitudinal axis of the tooth to retain the tooth on the base. However, a clearance between the shank and the walls of the base socket allows relative movement between the tooth and the base resulting in a rocking movement between the tooth and the base thereby causing abrasive wear between contacting parts of the tooth assembly. It is to this problem of rocking movement between the shank and socket that this invention is particularly addressed.

To remedy the problem of rocking between the shank 14 and socket 13 and the wear resulting therefrom, a resilient plug 30 is placed in opening 17 of shank 14 and against shank portion 31, having rearwardly divergent faces 31a and 31b. As viewed in the drawings, plug 30 is located between the forwardly diverging walls 18 of socket 13, and the plug is of such dimension as to provide a space between the adjacent divergent walls of the shank and base when the plug 30 is in a non-compressed condition. When the key 19 is inserted through openings 16 and 17, a face 21 of the key 19 engages plug 30 to compress it into engagement with the walls 18 of socket 13 and against shank portion 31. The expansion of the plug 30 against the walls 18 by the compressive force of the inserted key 19 prevents rocking movement between the tooth shank 14 and the socket walls 18 thus eliminating abrasive wear between the shank and the socket and between surfaces 11 and 20. In other words, the compressed plug 30 fills the space between walls 18 at plug surfaces 32. The faces 31a and 31b of portion 31 assist the flow of resilient material of plug 30 to the walls 18 during compression of the plug.

The plug 30 of the preferred embodiment is of a resilient material having metal wear plugs 25 molded therein to provide a metal to metal contact with the key 19 once the small amount of resilient material between wear plugs 25 and face 21 of key 19 is worn away.

Figure 2:
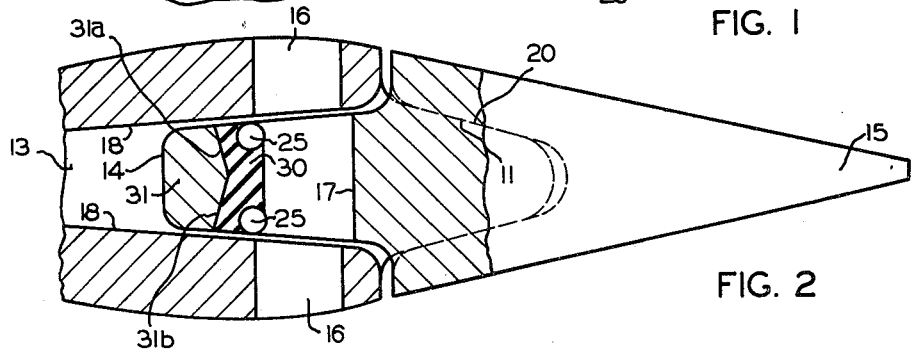
FIGURE 2 is a partial sectional view taken along line 2—2 of FIGURE 1.
Figure 3:
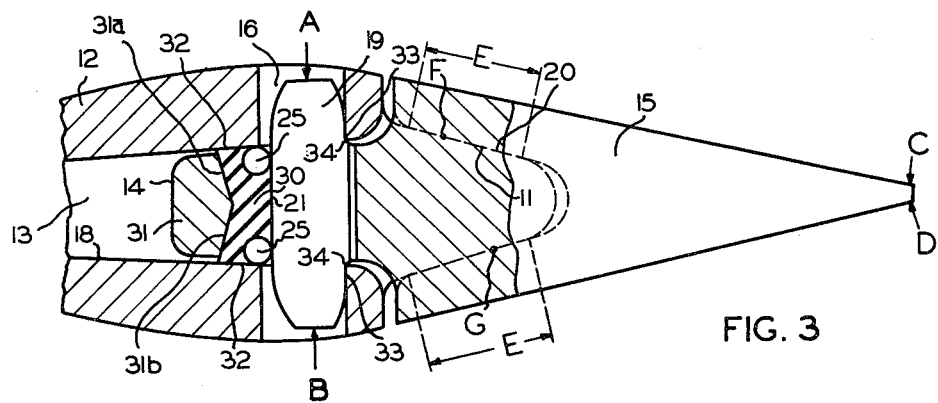
FIGURE 3 is a partial sectional view similar to FIGURE 2 but with a retainer pin or key inserted for connection.

Further, in the preferred embodiment of FIGURES 2 and 3 the surfaces 32 of plug 30 adjacent socket walls 18 are substantially parallel thereto.

With the plug 30 urged against shank portion 31, a reaction force resulting therefrom aids in maintaining key 19 in position as it is forced against surfaces 33 of base 12. Additionally, key 19 is provided with arcuate recesses 34 on the key face opposite face 21. The recesses 34 are in engagement with faces 33 and resist movement of the key 19 as by forces acting at surfaces A and B.

Figure 4:
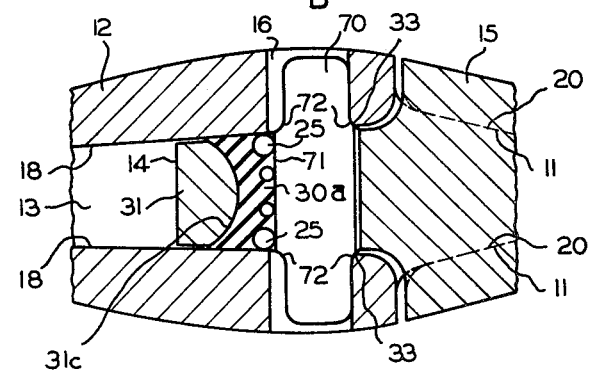
FIGURE 4 is a partial sectional view of a second embodiment of the invention with a retainer pin or key inserted for connection.

In FIGURE 4, a second embodiment of the invention is shown wherein shank portion 31 is provided with a rearwardly curved surface 31c to facilitate the flow of resilient material of resilient plug 30a against socket walls 18. Thus when key 70 is inserted in opening 16, surface 71 engages resilient plug 30a to compress the plug against curved surface 31c to flow the resilient material into compressive engagement against walls 18 to prevent rocking of the shank with respect to surfaces 11 and 20.

The key 70 is provided with arcuate surfaces 72 on opposite faces thereof so that the key may be readily inserted with either face contacting plug 30a for locking the key as at surfaces 33.

To illustrate the forces acting on a tooth point 15, a force C (FIGURE 3) is representative of a digging force and a force D is representative of back slap impact on the tooth point. The pivoting of the tooth occurs at surfaces 11 and 20 within a range E as these surfaces are not ordinarily machined and thus do not necessarily remain in continuous contact within range E. A high point occasioned by a casting of the tooth elements within range E will act as a fulcrum point, as for example at points F and G. Thus when the digging force C or back-slap force D acts on the tooth point, a rocking action about a fulcrum such as F or G will be resisted by the compressive force of the resilient plug 30 or 30a acts against socket walls 18.

Figure 5:
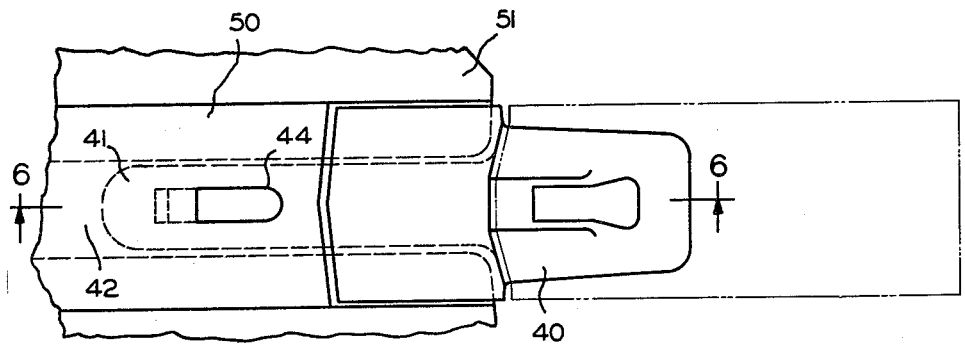
FIGURE 5 is a plan view of a fragment of the lip of an excavator carrying an adapter for a tooth point thereon.
Figure 6:
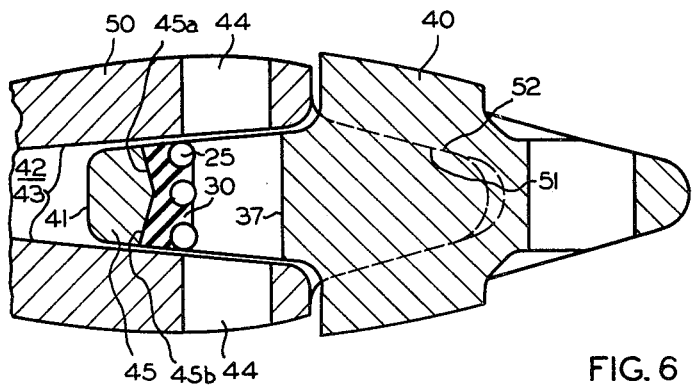
FIGURE 6 is a sectional view taken along line 6—6 of FIGURE 5.
Figure 7:
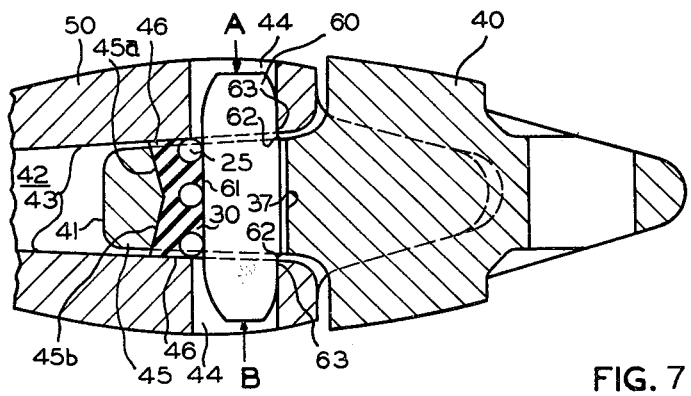
FIGURE 7 is a similar view of FIGURE 6 with the retainer pin or key inserted therein.

Reference is now made to FIGURES 5, 6, and 7 wherein an adapter 40 for a tooth point (not shown) is shown mounted in a base 50 on an excavator or dipper lip 51. A shank 41 of adapter 40 is inserted in socket 42 wherein nominal clearances exist between the shank 41 and the forwardly diverging walls 43 of socket 34. Aligned openings 44 are provided in the upper and lower portions of the base 50. An opening 37 is provided in shank 41 so that when shank is inserted in socket 42 the key 60 may be inserted therethrough.

Again the problem of relative movement and wear between the shank and the socket walls is remedied by the placement of a resilient plug in the shank between the socket walls. As viewed in the drawings, plug 30 is placed between the diverging walls 43 of socket 42. The plug 30 is of such dimension as to provide a space between the adjacent divergent walls of the shank and base when the plug 30 is in a non-compressed condition against shank portion 45. When the key 60 is inserted through openings 44 and 37, a face 61 of the key 60 engages plug 30 to compress the plug 30 against rearwardly diverging faces 45a and 45b of the shank portion 45 which expands the plug 30 against the socket walls 43. Again the compression of the plug 30 and the resultant expansion thereof against the walls 43 fills the space in the socket at surfaces 46 to prevent rocking movement between the adapter shank 41 and the socket walls 43 and surfaces 51 and 52 thus eliminating abrasive wear therebetween.

Additionally, the compressive force of plug 30 acting against key 60 (FIGURE 7) aids in retaining the key 60 in position. Further, recesses 62 are provided in the face opposite key face 61 (FIGURE 7) to engage portions 63 of the base to aid in maintaining the key in position when acted on by forces acting at surfaces A and B.

The plug 30 can easily be removed and replaced when the key has been driven from the base openings from either direction. Also recesses such as 62 could be provided in both faces of the key 60 to provide a key that can be placed in position in the openings 44 and 37 regardless of the key face bearing against resilient plug 30.

Thus, a resilient connection means has been described which is compressed by the insertion of a key in openings provided in a base and a shank, and such compression results in an expansion of a resilient plug against the socket walls as the compressed material flows over the faces of the shank portion. In this manner, rocking motion of the shank in the socket is prevented and abrasive wear between the connected elements of the tooth assembly is substantially eliminated. Also the resilient plug serves to absorb shock between the shank and the base. As described hereinabove, the preferred embodiment of the resilient connection means is applicable to a tooth shank and an adapter shank as mounted in a socket and hereinabove described.

Having now illustrated and described two embodiments of this invention, it is to be understood that the invention is not to be limited to the specific form or arrangement of parts herein described and shown or specifically covered by the claims, and in the claims the term tooth includes both a tooth or tooth point, and a tooth adapter.

What is claimed is:

1. In an excavator tooth assembly the combination comprising: a tooth base having a socket recessed therein, a seating lip adjacent the entrance of the socket, and openings transverse of and entering into said socket; a tooth with surface areas that are complementary to and abut upon said seating lip, a shank portion received in said socket, and a keyway extending transversely through said shank portion that is aligned with said openings in said tooth base; a resilient plug of material softer than said tooth base and said tooth which is fitted in said keyway with end surfaces thereof facing the walls of said socket for tight engagement therewith; said resilient plug being thicker at its ends that engage said socket walls than at its center and said keyway being contoured to match said plug; and a key having forward and rearward faces inserted in and extending between said openings and said keyway with one of said faces engaging the walls of said openings, and the other of said faces engaging said resilient plug and compressing the same to place the plug in tight engagement with the socket walls, insertion of said key drawing said surface areas of said tooth up tight upon said seating lip of said tooth base.

2. In an excavator tooth for use with a tooth receiving base, the combination comprising: a wedge shaped cutting portion; a seating abutment at the rear of said wedge shaped portion; a shank at the rear of said tooth and having a keyway extending transversely therethrough; and a resilient member positioned in said keyway along one side thereof which is of a material softer than the other parts of said tooth and which has exposed ends at the openings of the keyway; said resilient member also being thicker at its ends than at its center, and said keyway being contoured to match said member.

References Cited by the Examiner

UNITED STATES PATENTS

| | | |
|---|---|---|
| 1,874,783 | 8/32 | Mekeel. |
| 2,258,135 | 10/41 | Curtis. |
| 2,702,490 | 2/55 | Launder. |
| 2,772,492 | 12/56 | Murtaugh. |
| 2,846,790 | 8/58 | Davis. |
| 3,012,346 | 12/61 | Larsen. |
| 3,126,654 | 3/64 | Eyolyson. |

FOREIGN PATENTS 213,291  2/58  Australia.

BENJAMIN HERSH, *Primary Examiner.*